Nov. 9, 1965  L. PÉRAS  3,216,404
ROTARY DIESEL ENGINES
Filed May 16, 1962  2 Sheets-Sheet 1

Inventor
Lucien Péras
By Stevens, Davis, Miller & Mosher
Attorneys

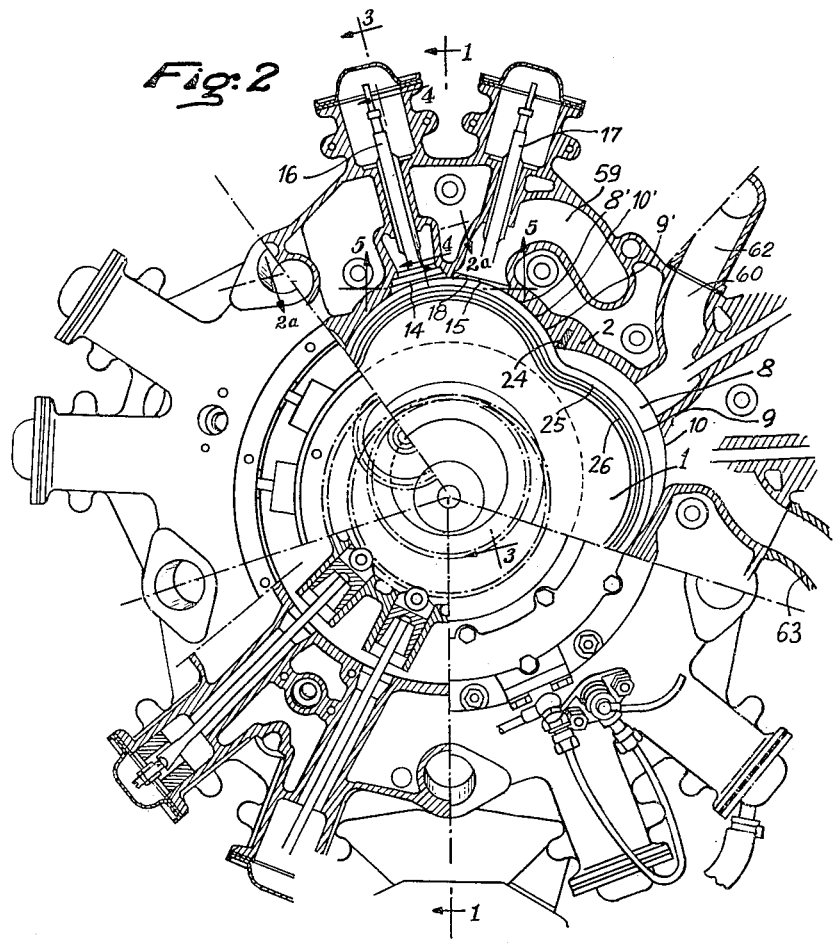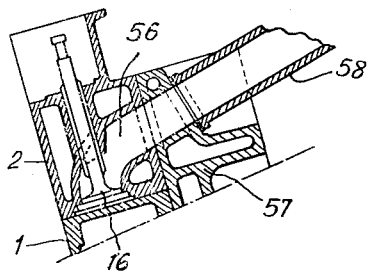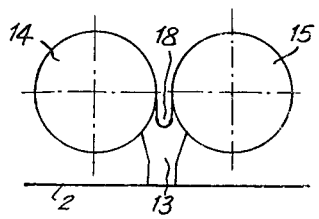

United States Patent Office 3,216,404
Patented Nov. 9, 1965

3,216,404
ROTARY DIESEL ENGINES
Lucien Péras, Billancourt, France, assignor to Regie
Nationale des Usines Renault, Billancourt, France
Filed May 16, 1962, Ser. No. 195,261
Claims priority, application France, May 26, 1961,
863,066, Patent 1,297,913
1 Claim. (Cl. 123—8)

This invention relates to a diesel cycle rotary engine of the type comprising a rotor formed with N lobes having an epicyclic contour which rotates eccentrically in a stator having (N+1) working chambers.

Each working chamber is designed to comprise a combustion chamber proper shaped to operate according to a diesel cycle with a pre-combustion chamber in which a jet of fluid fluel is delivered by an injector. This chamber has a specific configuration. Its very flattened shape is bound at its lower portion by the epicyclic contour of the rotor and at its upper portion by a pair of cylindrical or frustoconical recesses disposed concentrically to the two inlet and exhaust valves. In plane view it has a rectangular configuration limited by two planes of the side flanges.

The pre-combustion chamber is disposed laterally along a horizontal axis at a level substantially higher than the top of the rotor epicyclic contour. This chamber of semi-ovoid configuration is provided with a conventional pre-heating plug and an injector of known type, and is closed by a cup connected to the combustion chamber through an oblique duct continued by a second central duct disposed centrally of the combustion chamber and opening into this chamber just above the epicyclic contour of the rotor between the two valves.

The working chambers are disposed radially and the likewise radial inlet and exhaust valves are inclined symmetrically to the axis of each chamber.

An engine according to this invention will now be described with reference to the accompanying drawings illustrating diagrammatically by way of example a typical embodiment thereof.

Figure 1:
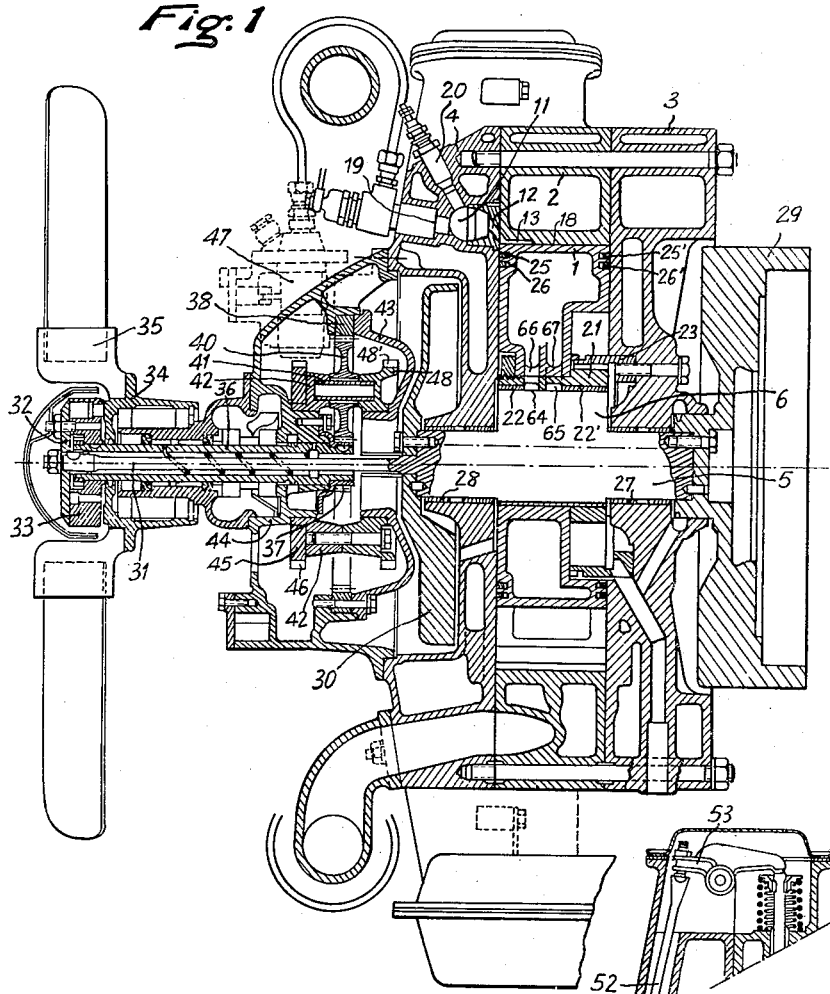
Figure 2A:
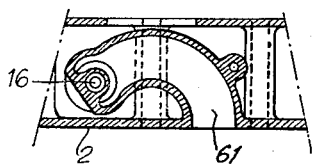
Figure 3:
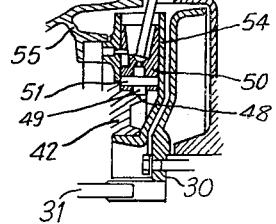

In the drawings:
FIGURE 1 is a longitudinal section of the engine;
FIGURE 2 is a cross-sectional view of the same engine;
FIGURE 2a is a sectional view showing a modified detail;
FIGURE 3 is a fragmentary section showing the valve follower, push-rod and valve disposal;
FIGURE 4 is a radial section taken along a valve; and
FIGURE 5 is a plane view showing the position of the valves and of the central duct.

Referring first to FIGS. 1 and 2, the reference numeral 1 designates the engine rotor, 2 the stator, 3 and 4 the side flanges and 5 the crankshaft carrying an eccentric 6 on which the rotor 1 is journaled.

A working chamber 8 is shown, notably in FIG. 2; this chamber is bound by the epicyclic contour 9 of the rotor, the conjugate curve 10 of the stator and the lateral faces on the flanges.

The upper chamber 8' is shown at the end of the compression movement and it will be seen that the epicyclic contour 9' of the rotor merges into the conjugate stator curve 10', except for the necessary operating tolerances. The volume of the compressed gas, which is calculated with a view to produce a spontaneous ignition thereof, comprises the volume of the pre-ignition chamber 11, of the oblique duct 12, of the upper duct 13 and of the pair of cylindrical or frustoconical recesses 14, 15 concentric to the inlet and exhaust valves 16 and 17, respectively.

In FIG. 5 the duct 13 terminates with an outflaring portion coincident with the center lines of the valves and opens into each one of the recesses 14, 15 which are separated by a lug 18.

In the pre-ignition chamber 11 an injector 19 and a preheating plug 20 are disposed, as shown.

A driving gear 21 solid with the rotor acts at the same time as a bearing and carries a pair of bushes 22, 22′ permitting the rotation on the eccentric 6.

A fixed internally toothed annulus 23 solid with the stator is in meshing engagement with the gear 21.

The fluid-tightness is obtained in the radial direction by packings 24 at either end of the working chamber 8 and laterally by a pair of concentric rings 25, 26 and 25′, 26′ of epicyclic configuration, fitted in suitable grooves formed in the rotor and in sealing engagement with the inner faces of flanges 3, 4.

Each flange 3, 4 carries a bush 27, 28 providing the shaft line of crankshaft 5, the latter carrying at one end a flywheel 29 provided with a counterweight, and at the opposite end a torque shaft extension 31 for driving the timing gear, the injection pump, the ancillary apparatus and the cooling fan. To this end, a disc 32 is keyed on this shaft end and connected to a counterplate 33 and to a hub 34 supporting the cooling fan 35. A hollow shaft 36 rigid with this hub 34 drives with its opposite end the sun gear 37 of an epicyclic train comprising a fixed internally toothed annulus 38 and planet wheels 40 in which shafts 41 carried by a planet carrier 42 are fitted.

The planet carrier 42 revolves on bearing 43, 44 and carries a cam 45 formed with lobes or raised portions 46 controlling an injection pump 47 delivering fluid fuel to the injectors 19.

The planet carrier 42 also acts as a valve timing cam plate 48 formed with lobes 48′ located on the side opposite to the cam 45.

As shown in FIG. 3 valve-follower rollers 49 are mounted through pins 51 on the valve-follower bodies 50.

These valve follower bodies 50 actuate push-rods 52 controlling rockers 53 transmitting to the valves 16 and 17 the lifting movements produced by the cam plate 48.

The valve followers 50 are disposed radially in a support 54 of circular configuration secured on a case 55 centered in turn and secured by bolts in the flange 4.

As shown in FIG. 4 each valve 16, 17 is disposed on an axis perpendicular to the longitudinal axis of the engine so that the valve head extends parallel to the generatrices of the rotor epicyclic contour. Ducts 56 moulded integrally with the stator are formed with extensions 57 in one of the flanges 3 or 4 and also with outer pipe extensions 58.

These ducts 56 may have different alternate configurations as shown for example at 59, 60, 61 and the pipes 58 may also vary in shape as shown at 62, 63.

The rotor 1 may be cooled by circulating oil under pressure through inlet ducts 64 and outlet ducts 65 in the crankshaft which communicate with ducts 66 and 67 respectively in the rotor 1.

I claim:
A rotary diesel engine comprising a rotor having N lobes of epicyclic contour, a stator having an inner surface comprising N+1 working chambers disposed about an axis, each said working chamber comprising a conjugate curve cooperable with said rotor lobes and each said working chamber being separated from adjacent chambers by portions of said stator at a lesser radial distance from said axis; said rotor being disposed to rotate about its own axis as its own axis rotates about the stator axis, an inlet valve and an exhaust valve in communication with each said working chamber, said valves being disposed on axes perpendicular to said stator axis, and precombustion chambers disposed in said stator, a precombustion chamber adjacent each working chamber, each precombustion chamber having a fuel injector and a preheating plug in communication therewith, each said precombustion chamber being disposed radially outward of the outermost portion of its working chamber and axially displaced from one end of said rotor, said precombustion chamber preferably having a semi-ovoid configuration, oblique ducts communicating with each said precombustion chamber, and central ducts in the inner surface of said housing in each of said working chambers, each said central duct communicating with one of said oblique ducts and said working chamber, said central ducts communicating with said oblique ducts above the rotor epicyclic configuration and between the points at which said valves communicate with said working chamber.

References Cited by the Examiner

UNITED STATES PATENTS

| | | | |
|---|---|---|---|
| 2,120,768 | 6/38 | Ricardo | 123—32 |
| 2,126,442 | 8/38 | Baud | 123—32 |
| 3,053,238 | 9/62 | Meurer | 123—8 |
| 3,058,452 | 10/62 | Espenschied | 123—32 |

FOREIGN PATENTS

| | | |
|---|---|---|
| 1,059,495 | 11/53 | France. |
| 124,284 | 3/19 | Great Britain. |

OTHER REFERENCES

In Revue Automobile, No. 49, 1961, pp. 15–27.

Huf, F.: Historique des Machines a Piston Rotatif.

Wankel et al.: Bauart und gegenwartiger Entwicklungsstand einer Trochoiden-Rotationskolhenmaschine. In MTZ 21 (2), pp. 33–45, February 1960, TJ 751–M6.

SAMUEL LEVINE, *Primary Examiner.*

KARL J. ALBRECHT, JOSESPH H. BRANSON, JR.,
*Examiners.*